Sept. 1, 1942.  E. H. KLINGELFUSS  2,294,503
PRINTING MACHINE
Filed Oct. 10, 1941  9 Sheets-Sheet 1

INVENTOR.
EUGENE H. KLINGELFUSS
BY
ATTORNEY.

Sept. 1, 1942.  E. H. KLINGELFUSS  2,294,503
PRINTING MACHINE
Filed Oct. 10, 1941   9 Sheets-Sheet 2

INVENTOR.
EUGENE H. KLINGELFUSS
BY Edward [signature]
ATTORNEY.

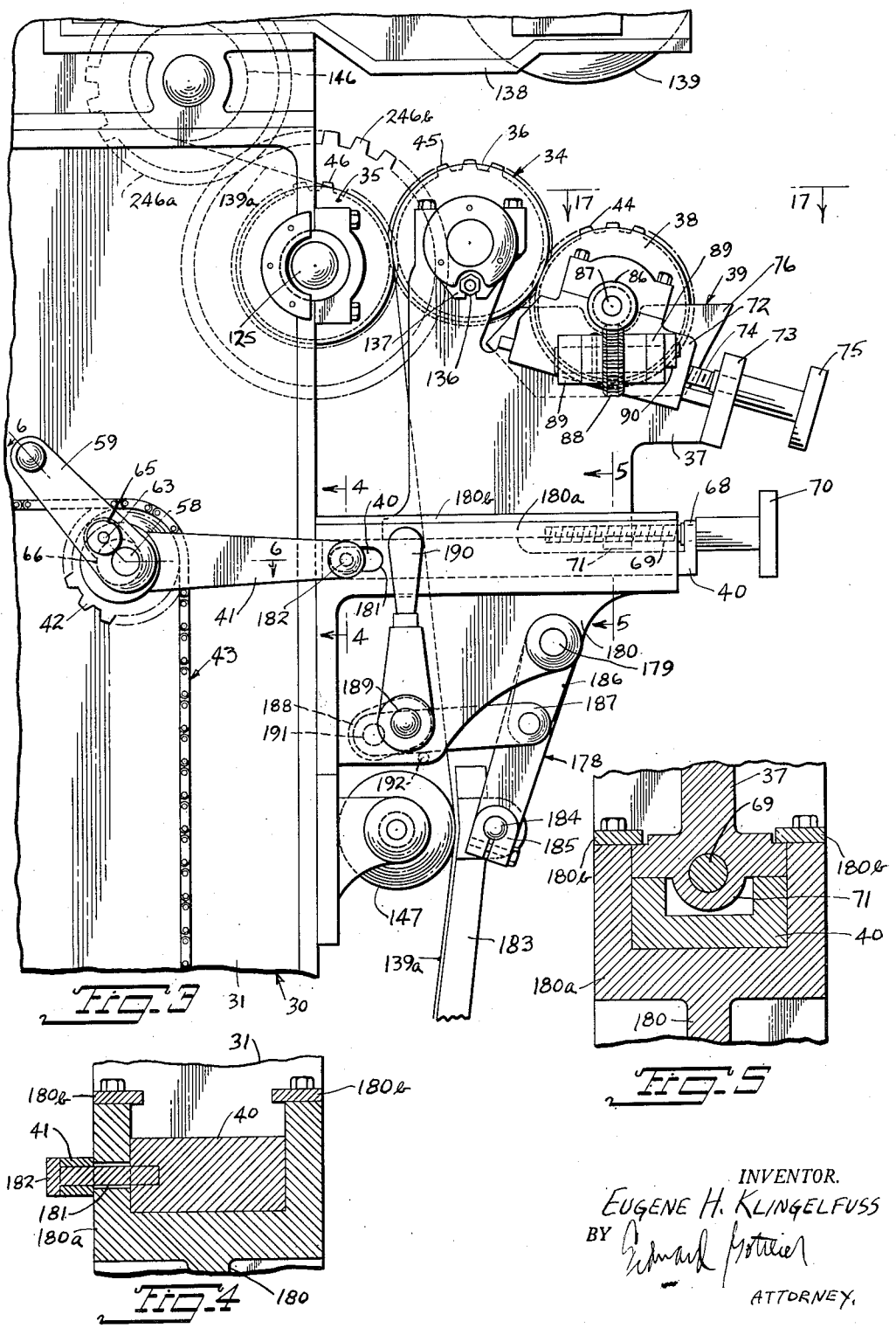

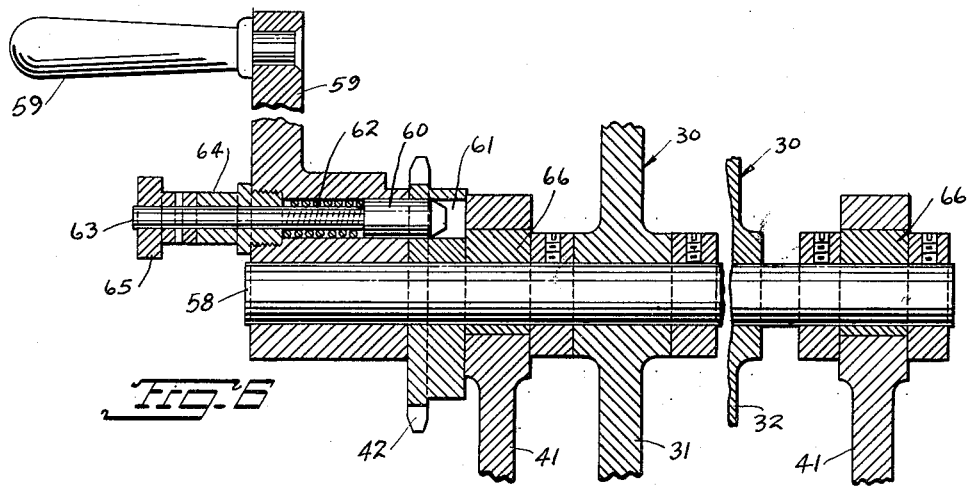
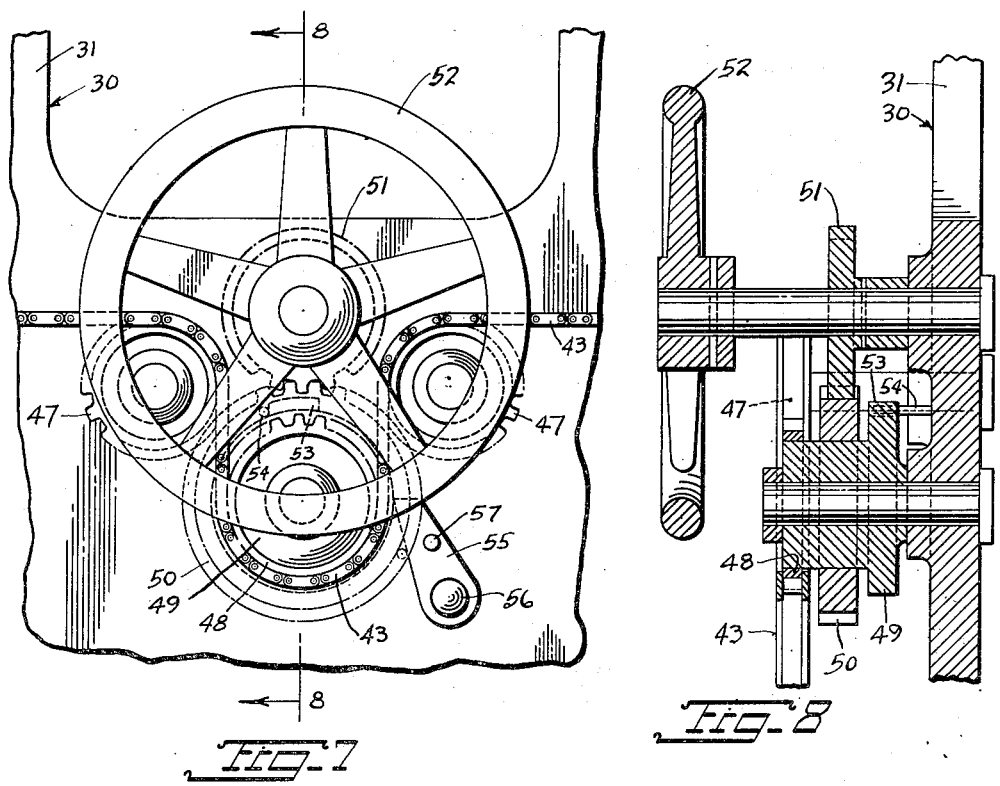

Sept. 1, 1942. E. H. KLINGELFUSS 2,294,503
PRINTING MACHINE
Filed Oct. 10, 1941 9 Sheets-Sheet 5
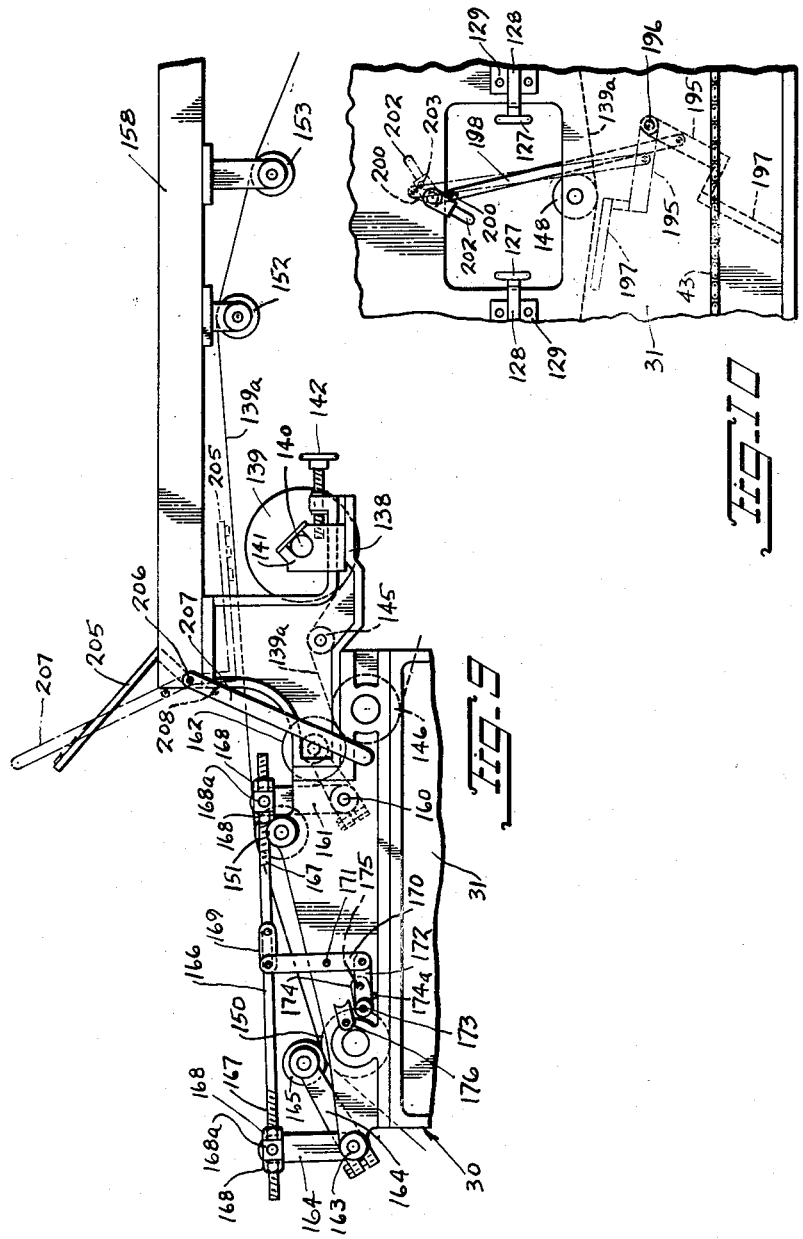
INVENTOR.
Eugene H. Klingelfuss
BY
ATTORNEY.

Sept. 1, 1942.　　　E. H. KLINGELFUSS　　　2,294,503
PRINTING MACHINE
Filed Oct. 10, 1941　　　9 Sheets-Sheet 6
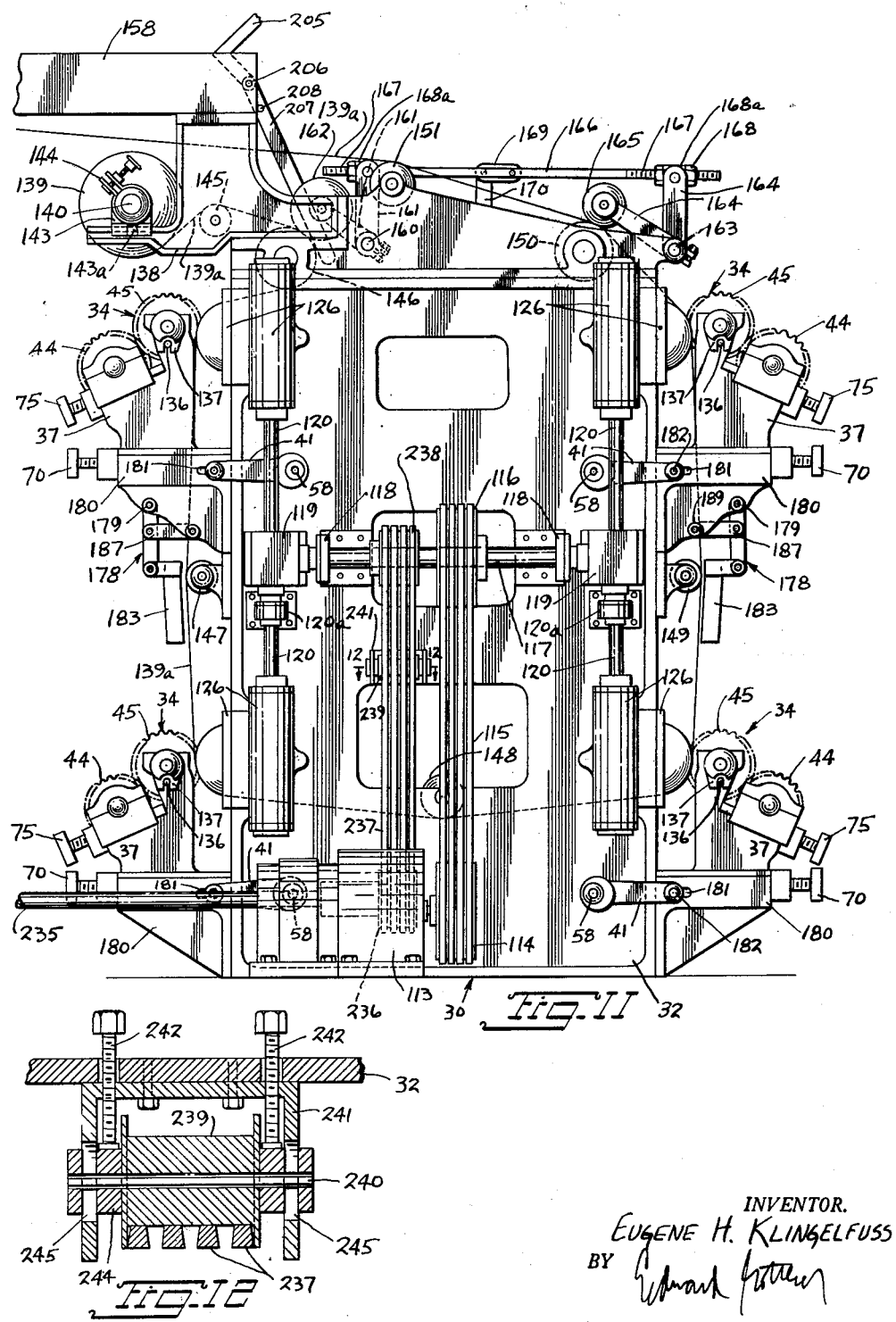
INVENTOR.
EUGENE H. KLINGELFUSS
BY
ATTORNEY.

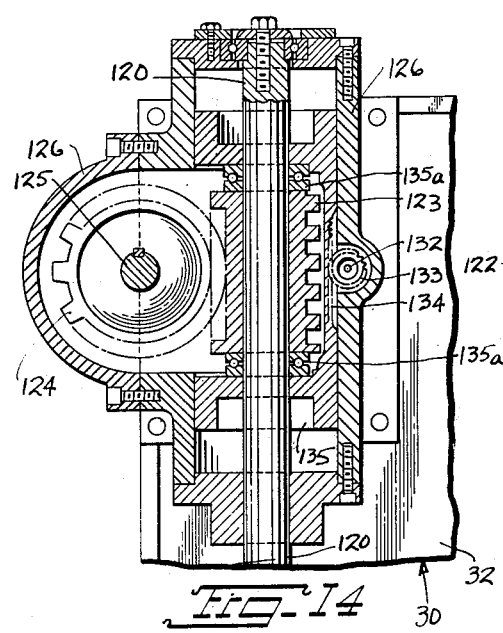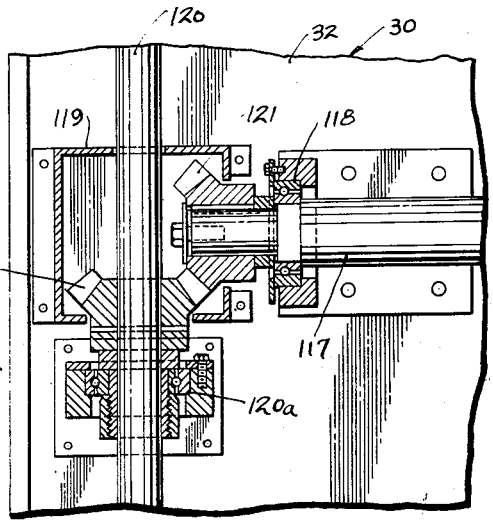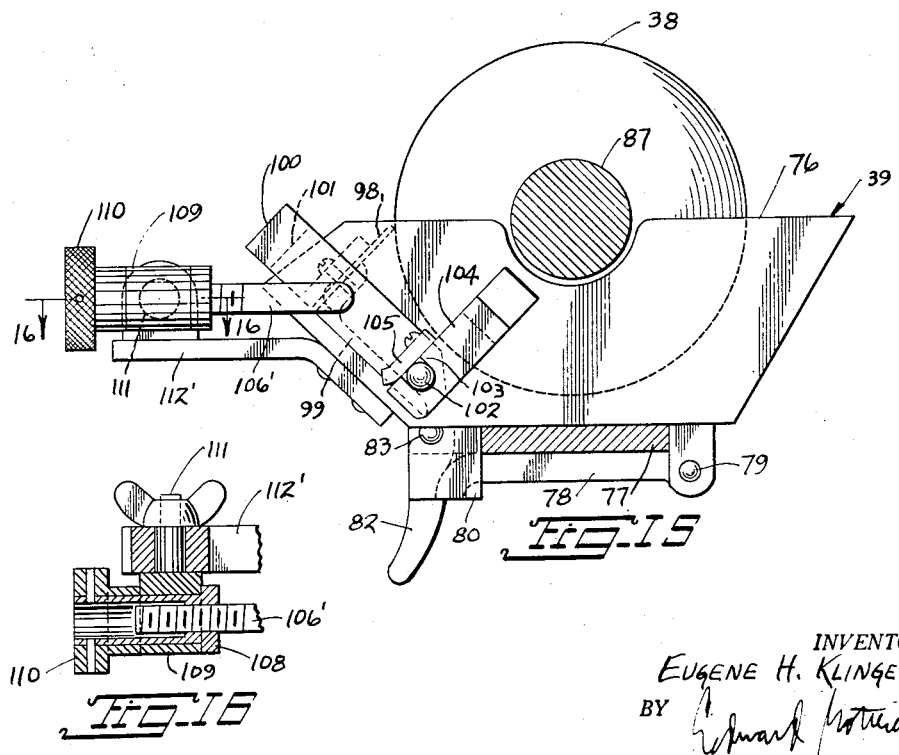

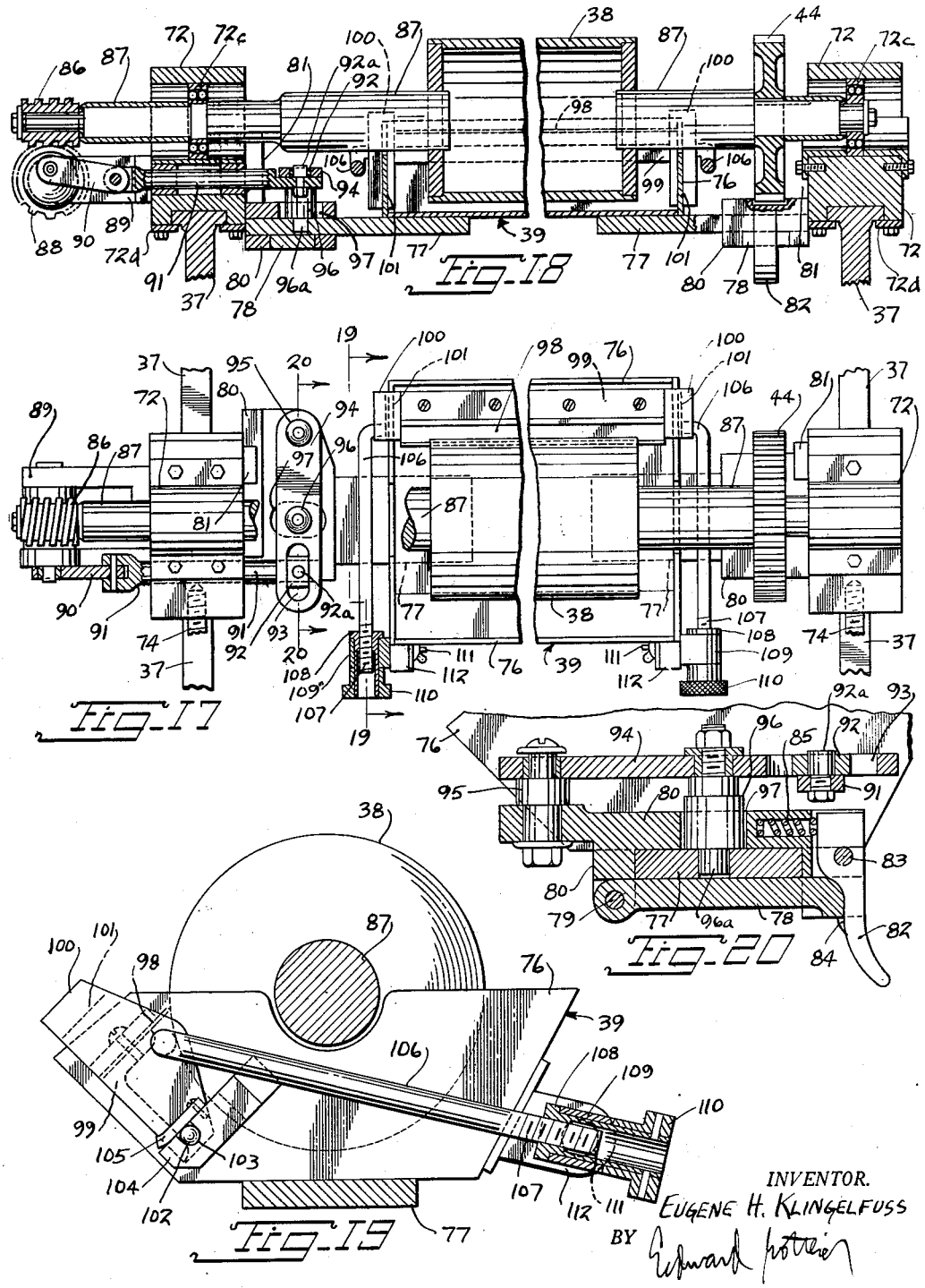

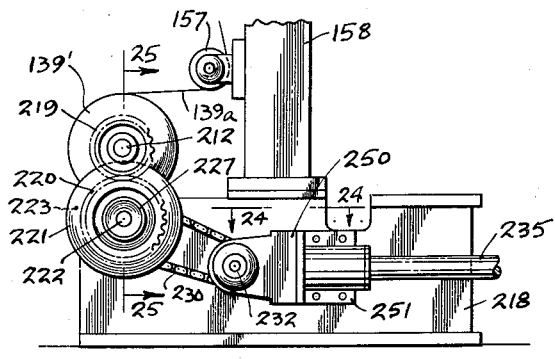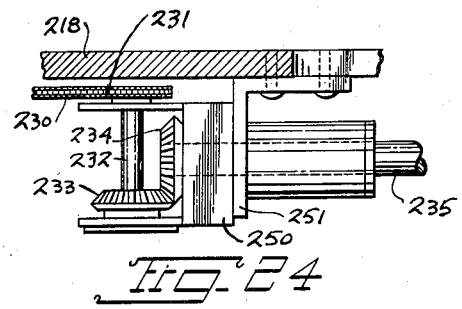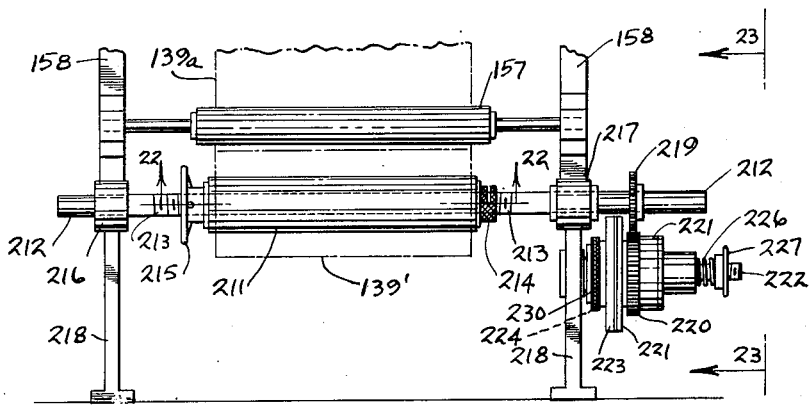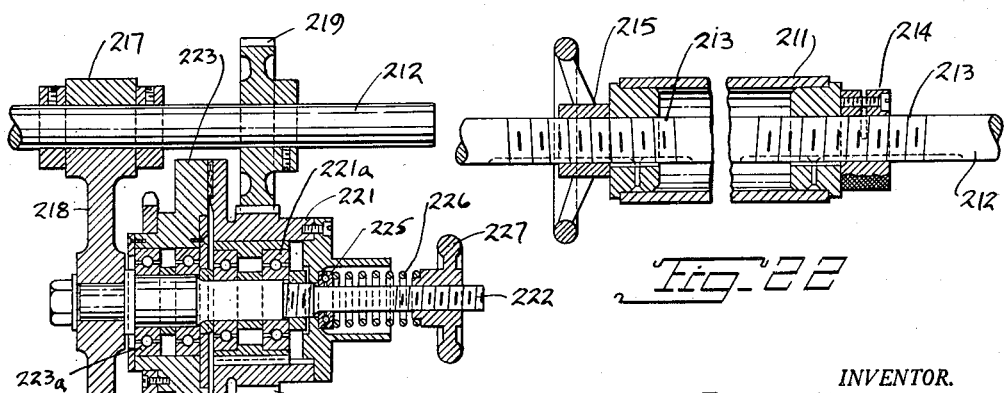

UNITED STATES PATENT OFFICE 2,294,503

PRINTING MACHINE

Eugene H. Klingelfuss, Brooklyn, N. Y., assignor to Klingrose Machine Corporation, Brooklyn, N. Y., a corporation of New York Application October 10, 1941, Serial No. 414,396

9 Claims. (Cl. 101—350)

This invention relates to new and useful improvements in a continuous web printing machine.

The invention particularly proposes numerous improvements in the various units of the machine. One of the improvements for continuous web printing machines relates particularly to a printing machine having a plurality of printing units each having a counter pressure drum mounted on the frame of the machine and cooperative with a cylindrical form which is mounted in a casing supporting a cooperative furnishing roller and ink supply. It is proposed that slides support said casings, and that a mechanism be provided for simultaneously moving said slides to simultaneously separate said counter pressure drums and cylindrical forms.

The invention also relates to a printing machine in which the printing units have meshing gears on the counter pressure drum and the cylindrical form. It is proposed that means be provided for limiting motion of the slides previously referred to, to prevent disengagement of said gears while said drums and forms are separated, and said means to be controllable to permit simultaneously disengagement of said gears, when desired.

The invention also proposes an arrangement whereby the slides may be individually moved to individually disengage the meshing gears, when this is desired.

The invention also relates to novel improvements in each printing unit characterized by a novel arrangement of ink pan and doctor blade for the furnishing roller. It is proposed to mount the ink pan in a certain way so that it is readily removable when desired. It is also proposed to oscillate the ink pan in a certain manner during the operation of the machine.

The invention also proposes a novel arrangement for supporting and adjusting the pressure of the doctor blade against the furnishing roller.

Another object of the invention relates to a novel arrangement in a continuous web printing machine having a plurality of printing units, which arrangement relates to a feed mechanism for assisting in feeding the web through the machine associated particularly with the first and last printing units. A construction is proposed whereby this feeding mechanism, at these two points, may be simultaneously placed into and disengaged from operation when desired. It is proposed to characterize this mechanism by a novel arrangement in which a lever moves past a dead center for locking the parts in operative positions. With this arrangement the lever may be moved from past its dead center position, and then the feeding mechanism may be rendered inoperative.

The invention also relates to a novel arrangement of heating units for each of the printing units. It is proposed to characterize these heating units by an arrangement whereby a lever which may pass a dead center controls the operative and inoperative positions of each unit. With this arrangement it is a simple matter to project a heating unit into operative position and withdraw it when this is decided.

The invention also contemplates a novel construction of the web rewinding unit. In prior units it was necessary to adjust a moving wheel or part for adjusting the slip of the rewinding unit. This invention proposes a construction in which it is possible to adjust a stationary part for controlling the desired slip.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure—

Fig. 3 is a fragmentary enlarged detailed view of a portion of Fig. 1 showing particularly the upper right hand part of the printing machine proper, shown in Fig. 1.

Fig. 4 is a fragmentary enlarged vertical sectional view taken on the line 4—4 of Fig. 3.

Fig. 5 is a fragmentary enlarged vertical sectional view taken on the line 5—5 of Fig. 3.

Fig. 6 is a fragmentary enlarged sectional view taken on the line 6—6 of Fig. 3.

Fig. 7 is a fragmentary enlarged elevational view of the central portion of the printing machine proper as shown in Fig. 1.

Fig. 8 is a vertical sectional view taken on the line 8—8 of Fig. 7.

Fig. 9 is a fragmentary enlarged detailed view of Fig. 1, particularly showing the upper portion of the machine.

Fig. 10 is a fragmentary enlarged detailed view showing a central portion of Fig. 1.

Fig. 11 is a rear elevational view of the printing machine proper shown in Fig. 1.

Fig. 12 is a fragmentary enlarged horizontal sectional view taken on the line 12—12 of Fig. 11.

Fig. 13 is a fragmentary enlarged vertical sectional view of a portion of Fig. 11 particularly showing the transmission between the horizontal shaft and one of the vertical shafts.

Fig. 14 is a fragmentary enlarged vertical sectional view of a portion of Fig. 11, particularly showing the upper portion of the left vertical shaft.

Fig. 15 is a fragmentary enlarged transverse vertical sectional view of one of the inking devices on the left hand side of the machine as illustrated in Fig. 1.

Fig. 16 is a fragmentary horizontal sectional view taken on the line 16—16 of Fig. 15.

Fig. 17 is a fragmentary plan view looking in the direction of the line 17—17 of Fig. 3.

Fig. 18 is a fragmentary vertical sectional view of Fig. 17.

Fig. 19 is a sectional view taken on the line 19—19 of Fig. 17.

Fig. 20 is a fragmentary sectional view taken on the line 20—20 of Fig. 17.

Fig. 21 is a fragmentary end elevational view looking in the direction of the line 21—21 of Fig. 1.

Fig. 22 is a horizontal sectional view taken on the line 22—22 of Fig. 21.

Fig. 23 is an elevational view looking in the direction of the line 23—23 of Fig. 21.

Fig. 24 is a fragmentary enlarged horizontal sectional view taken on the line 24—24 of Fig. 23.

Fig. 25 is a fragmentary vertical sectional view taken on the line 25—25 of Fig. 23.

Figure 1:
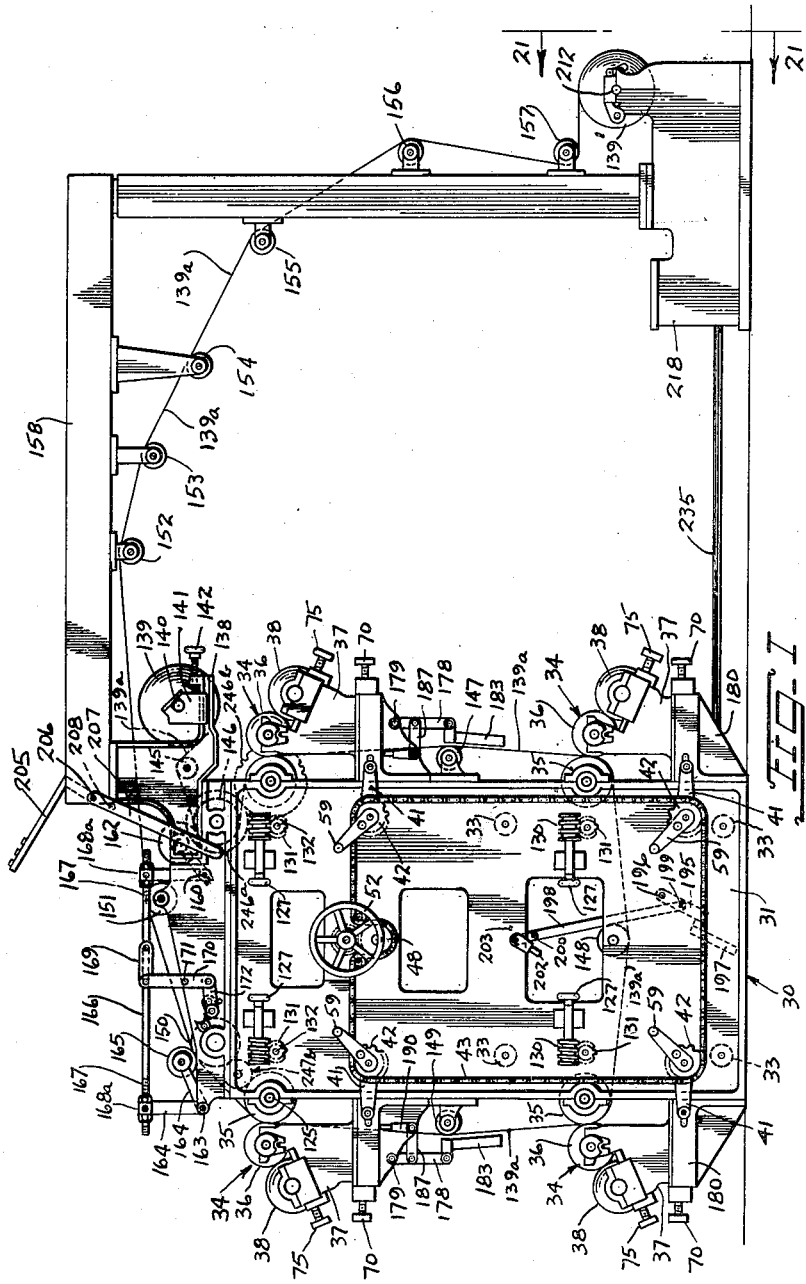
Fig. 1 is a side elevational view of a printing machine constructed in accordance with this invention.
Figure 2:
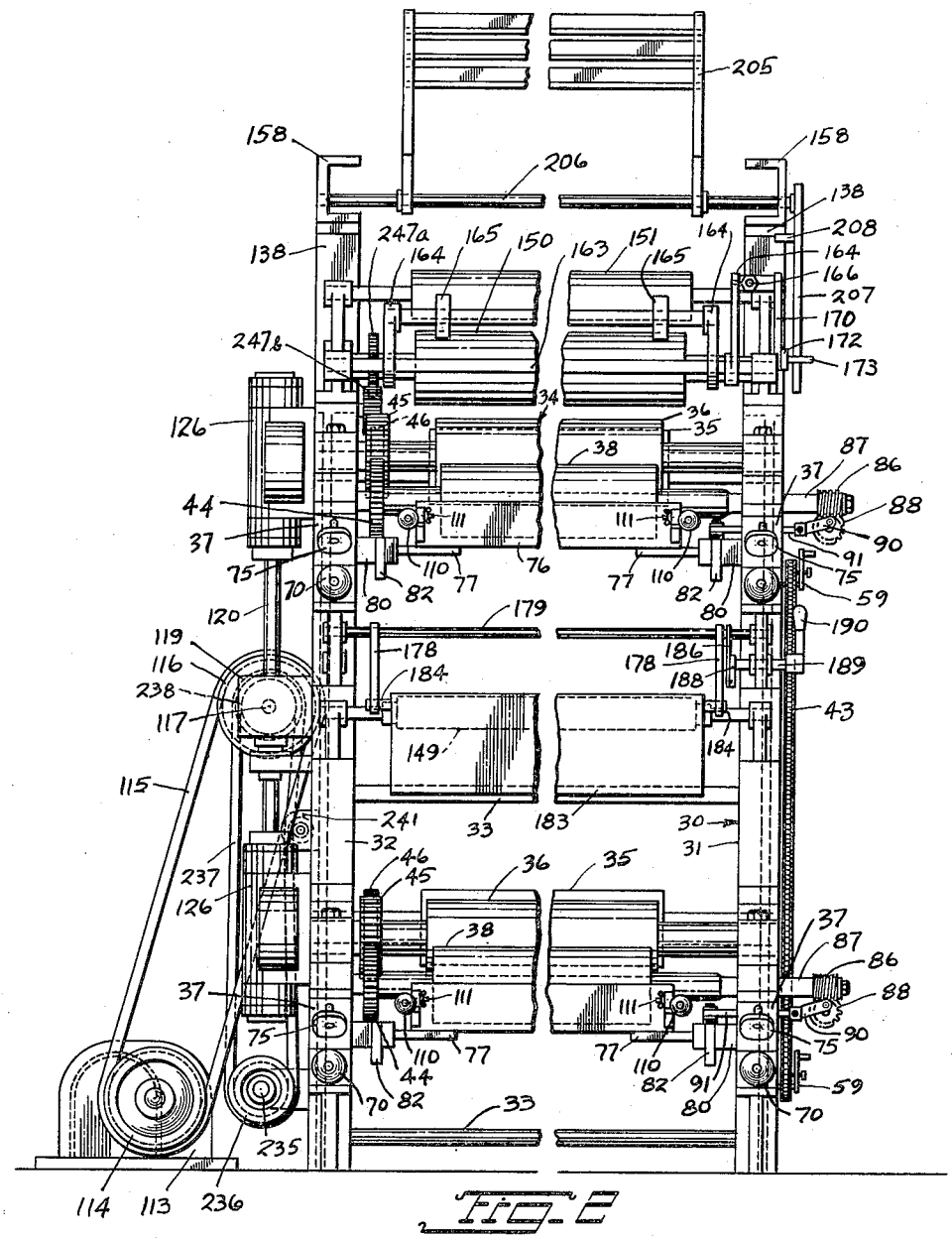
Fig. 2 is an end elevational view looking from the left hand end of Fig. 1.

The continuous web printing machine, in accordance with this invention, includes a frame 30 which consists of a pair of spaced side walls 31 and 32 connected together as a plurality with braces 33, see Figs. 1 and 2. A plurality of printing units 34 are mounted upon the frame 30. In the particular machine illustrated in Fig. 1, there are two printing units 34 mounted upon the right hand side of the frame 30 and two printing units 34 mounted on the left hand side of the frame. Each of these printing units 34 includes a counter pressure drum 35 which is rotatively mounted upon the frame 30 and which is cooperative with a cylindrical form 36 which is mounted on a casing 37 supporting a cooperative furnishing roller 38 and an ink supply 39 (see Figs. 3 and 17). The casing 37 of each printing unit 34 essentially consists of a pair of laterally spaced walls, see Fig. 2, and each wall is mounted on a slide 40, see Figs. 3 and 5. These slides 40 are associated with means for simultaneously moving said slides 40 to simultaneously separate said cylindrical forms 36 from the counter pressure drums 35. This means is characterized by arms 41 connected with the slides 40 (see Figs. 3 and 4) and associated in a certain way with sprockets 42 engaged by an endless chain 43, as will be hereinafter more fully described.

Each of the printing units 34 is provided with meshing gears on the drums and rollers thereof. More specifically, each counter pressure drum 35 is provided with a gear 46 (see Figs. 2 and 3) which meshes with a gear 45 on the cylindrical form 36 which in turn meshes with a gear 44 on the furnishing roller 38, see particularly Figs. 2 and 3. The counter pressure drums 35 are driven, as will subsequently become clear, and the rotations are transmitted by said gears to the cylindrical forms 36 and furnishing rollers 38. Means is provided for limiting motion of the slides 40 to prevent disengagement of the gears 45 on the cylindrical forms 36 and the gears 46 on the counter pressure drums 35. This means may be best understood by examining Figs. 1 and 7. The endless chain 43 passes over a pair of laterally spaced sprockets 47 mounted on the wall 31 of the frame 30. The chain 43 then continues and engages beneath a sprocket 48 which is mounted coaxially on a drum 49 rotatively mounted on the said wall 31.

The drum 49 is provided with a gear 50 which meshes with a gear 51 rotatively mounted on the wall 31. The gear 51 is coaxially fixedly connected with a hand wheel 52. The drum 49 has a projecting lug 53 which in the position of the parts shown in Fig. 7 engages against a pin 54 projecting from the wall 31. This limits turning of the drum 49 any further counter-clockwise. However the drum 49 may turn clockwise until the projection 53 strikes against a pawl 55. This pawl 55 is pivotally supported upon a pin 56. It is provided with a handle 57 by which it may be conveniently moved to an inoperative depending position, when desired. The hand wheel 52 may be turned so as to indirectly move the endless chain 43 so that the projection 53 moves between the pin 54 and the pawl 55.

When the projection 53 is against the pin 54, the arms 41 will be fully retracted so that the slides 40 are retracted and the cylindrical forms 36 engage the counter pressure drums 35. The hand wheel 52 may be moved so that the projection 53 engages the pawl 55 and then the arms 41 will be slightly extended so that the slides 40 are slightly extended and the cylindrical forms 36 disengage from the counter pressure drums 35. However, the gears 45 and 46 maintain their mesh. If desired, the pawl 55 may be pivoted clockwise and allowed to depend. Then the hand wheel 52 may be turned further so as to further move the endless chain 43 so that the arms 41 are further extended, further extending the slides 40 and thus disengaging the mesh of the gears 45 and 46.

Means is also provided for individually moving the slides 40 so that the gears 45 and 46 of any printing unit may be disengaged. This means may be best understood by an examination of Figs. 1, 3 and 6. The sprocket 42 of each printing unit is loosely mounted on a rod 58 which is turnably mounted on the walls 31 and 32 of the frame 30. A handle 59 is fixedly mounted on each rod 58. Each handle 59 is provided with a bolt 60 engaging a keeper opening 61 formed in the sprocket 42. The bolt 60 is urged into operating position by a spring 62. The bolt 60 has a reduced shank 63 passing through a stationary bushing 64. A knob 65 is mounted upon the outer end of the shank 63. The spring 62 works between the bushing 64 and the head of the bolt 60. The arrangement is such that the knob 65 may be pulled to disengage the bolt 60 from the key opening 61. Then the handle 59 may be turned for projecting or retracting the arms 41 without any motion of the sprocket 42. Each arm 41 is mounted upon an eccentric 66 fixedly mounted on the rod 58. Thus when the rod 58 is turned the arms 41 thereof will be extended or retracted.

Each casing 37 is adjustably mounted on its slides 40. More specifically, each slide 40 has a lug portion 68, see Fig. 3, upon which a screw 69 is rotatively mounted. The outer end of each screw 69 is provided with a handle 70. The inner ends of the screws 69 threadedly engage socket portions 71 formed on the side walls of the casing 37. The arrangement is such that a pair of the handles 70 may be turned for manually adjusting each casing 37 to control the set pressure between each cylindrical form 36 and its counter pressure drum 35.

An arrangement is also provided for controlling the pressure between the furnishing roller 38 and the cylindrical form 36 of each printing unit. This arrangement includes brackets 72 slidably mounted on each casing 37 by means of retaining strips 72d, see Fig. 18. Each casing 37 is provided with lugs 73 through which screws 74 are rotatively mounted. These screws 74 threadedly engage the brackets 72. The screws 74 are provided with knobs 75 on their outer ends. The arrangement is such that a pair of the knobs 75 may be turned for moving the brackets 72 of one printing unit forwards and rearwards and so adjust the pressure between the furnishing roller 38 and its cylindrical form 36 of the printing unit.

Each ink supply 39 includes an ink pan 76 which has a pair of bars 77 attached on its bottom, and projecting from its sides. These bars 77 are releasably supported by flap members 78. These flap members 78 are pivotally mounted by pintles 79 upon auxiliary brackets 80 which are fixedly mounted by lugs 81 upon the brackets 72. The flap members 78 are releasably supported at their free ends by small latches 82. Each latch 82 is pivotally held near its top by a pintle 83. Intermediate of its ends it is formed with a shoulder 84 which catches the end of the flap member 78. A spring 85 acts between each auxiliary bracket 80 and the top end of the latch 82 for urging the latch into closed position. The construction is such that the latches 82 may be opened and then the flaps 78 lowered to release the bars 77. The ink pan 76 is then free to move downwards and out of the ink supply unit.

Means is provided for oscillating each ink pan 76. This means includes a worm 86 mounted on the shaft 87 of each furnishing roller 38. Each worm 86 meshes with a cooperative worm 88 rotatively supported on a bracket 89 mounted on the bracket 72. Each shaft 87 is rotatively supported on a pair of the brackets 72 by ball bearings 72c. A link 90 is eccentrically connected with each worm 88. Each link 90 is pivotally connected with an arm 91 slidably mounted through the bracket 72. The free end of each arm 91 is provided with a block 92 pivotally held in place thereon by a stud 92a, and said block is slidably engaged in the slot 93 formed in a transversely positioned arm 94. Each arm 94 is pivotally supported at one end by a pintle 95 on said bracket 80. Intermediate of its ends each arm 94 is provided with a stud 96 which extends through an elongated slot 97 formed in the auxiliary bracket 80. Each stud 96 has a reduced end 96a which engages into an opening in the adjacent arm 77. The arrangement is such that the rotations from the worms 86 and 88 are transmitted to oscillate the arms 91 and 94 which indirectly oscillate the adjacent arm 77 and thus the ink pan 76.

Each ink pan 76 is provided with a doctor blade 98 which is cooperative with its furnishing roller 38. Each doctor blade 98 is supported on a member 99 which is mounted across two blocks 100 mounted over the sides of each ink pan 76 in a certain way. Each block 100 has a slot 101 formed inwards from its bottom end. The sides of the ink pan 76 engages in these slots. Consequently one half of each block is outside of the side wall of the ink pan, while the other half is inside. The member 99 is mounted across the inside halves of the blocks 100. The outside halves of the blocks 100 are provided with outwardly projecting pins 102 which are pivotally supported. These pins 102 engage into slots 103 formed in blocks 104 attached to the ends of the ink pan 76. A latch 105 is pivotally mounted on each block 104, and engage over the open end of the slots 103 so as to normally hold said pins 102 releasably in position.

A pair of hook shaped rods 106 have their inner ends pivotally connected with the blocks 100 at points above the pins 102. The outer ends of the rod 106 are formed with threads 107 which threadedly engage bushings 108. These bushings 108 are rotative through brackets 109. Each bushing 108 has a head 110 by which it may be turned. Each bracket 109 is swivelly supported by a stud 111 (see Fig. 16). These studs 111 engage through supports 112 attached upon the front wall of the ink pan 76. The arrangement is such that the knobs 110 may be turned for pivoting the blocks 100 so as to cause each doctor blade 98 to engage under selective pressures with its furnishing roller 38.

The ink supply 39 is somewhat similar to the ink supply illustrated in my co-pending application, Serial No. 329,873, filed April 16, 1940, and covering a Printing fluid distributor for printing machines. From this prior application it may readily be understood that the furnishing roller 38 is engraved to have a plurality of small ink wells on its surface. The doctor blade 98 scrapes the ink off the furnishing roller, except for the deposits in these wells. The cylindrical form 36 has its printing surface constructed from resilient material, such as rubber. This cylindrical form comprises the printing form for the printing unit. However, because of its soft construction it is capable of entering the ink wells of the furnishing roller 38 and picks up the ink which is subsequently transferred to the web which is being printed.

The ink supply mechanism of the various printing units 34 are substantially identical, except for the fact that the doctor blades 98 are arranged on different sides of the furnishing rollers 38 for the reason that certain of the furnishing rollers are delivering ink at sides opposite to the delivery sides of the other furnishing rollers during the operation of the printing machine. In Fig. 19 the doctor blade 98 is shown against the outer side of the furnishing roller 38. In Fig. 15, which shows the ink supply on the other side of the machine, the doctor blade 98 is engaging against the inner side of the furnishing roller 38. For this reason it is required that short hook rods 106' be used in lieu of the long hook rods 106 shown in Fig. 16. Furthermore, the supports 112' which support the studs 111 are shaped somewhat differently than the supports 112. In other respects the parts are identical and like parts have been given the same reference numerals so that they may be readily identified.

A single source of power is used to operate the various printing units 34. More specifically, an electric motor 113 is provided with a pulley 114 over which belts 115 engage. These belts 115 engage over a pulley 116 upon a horizontal shaft 117 rotatively supported in bearings 118 mounted on the rear wall 32 of the frame 30. The horizontal shaft 117 has its ends engaging into a pair of casings 119 mounted on the wall 32. Vertical shafts 120 pass through these casings 119 and are rotatively supported by ball bearings 120a, see Fig. 13, which are mounted on the rear wall 32. The ends of the horizontal shaft 117 are provided with bevel gears 121 which mesh with bevel gears 122 mounted on the shafts 120 and located within said casings 119. Thus the shafts 120 are being indirectly driven by the motor 113. The ends of each shaft 120 is provided with a worm 123 which meshes with a complementary worm 124 mounted on the shaft 125 of the adjacent counter pressure drum 35. The worms 123 and 124 are located within casings 126 mounted on the said back wall 32.

An arrangement is provided for controlling the rotative registration of each cylindrical form 36. For each cylindrical form there is a handle 127 mounted on a rod 128 rotatively supported in a bearing 129 mounted on the wall 31 of the frame of the machine. Each rod 128 is provided with a worm 130 meshing with a complementary worm 131 on a shaft 132 extending across the machine to the wall 32 and entering the casing 126. Each shaft 132 is provided with a gear 133 meshing with gear teeth 134 on a slidable collar 135 vertically slidably mounted within the casing 126. This slidable collar 135 supports the said worm 123 with the aid of thrust bearings 135a. The arrangement is such that each handle 127 may be turned to indirectly raise or lower the slidable collar 135, within one of the casings 126 and this indirectly raises or lowers the worm 123. This causes a slight rotative turn of the worm 124 and shaft 125 and thus the counter pressure drum 35 is being turned. Since this drum 35 is geared with the cylindrical form 36 the latter is being adjusted. This arrangement permits an individual adjustment of each of the cylindrical forms. Each cylindrical form 36 may be axially adjusted by the usual screw 136, see Fig. 3, which is mounted on the casing 37 and which engages a flange 137 connected with the cylindrical form 36.

Brackets 138 are mounted upon the frame 30 and support a web supply roll 139. More specifically, this roll is mounted on a shaft 140 which is supported in slides 141 adjustably mounted on the brackets 138. A screw 142 is rotative on one of the brackets 138 and threadedly engages the slide 141. The other bracket 138 supports a pivotally mounted member 143 (see Fig. 11) turnable on pivot 143a which supports the other end of the shaft 140. The arrangement is such that the screw 142 may be turned in one direction or the other to horizontally move one end of the shaft 140 and so adjust the supply of the web to discharge straight. A brake 144 is mounted upon the pivotally mounted member 143 by which an adjustment may be made to prevent the web roll 139 from unwinding too fast.

From the roll 139 the web 139a extends over a guide roller 145 and then continues over a feeding roller 146 and continues over the counter pressure drum 35 of the first printing unit 34 and continues down over a guide roller 147 and then against the counter pressure drum 35 of the second printing unit 34, and then continues beneath a guide roller 148 to the counter pressure drum of the third printing unit and up over a guide roller 149 and over the counter pressure drum of the last printing unit. From this point the web 139a continues over another feeding roller 150 and then over a guide roller 151. From this point the web 139a continues over a group of guide rollers 152, 153, 154, 155, 156 and 157 mounted on an auxiliary frame 158 of the machine. The web then continues upon a rewind roll 139'.

A rod 160 is mounted between the walls 31 and 32 and supports bell cranks 161 at their centers. A cooperative wide feeding roller 162 is mounted upon one of the arms of the bell cranks 161 and is engageable against the web 139a at a point adjacent the feeding roller 146. Another rod 163 is pivotally mounted between the walls 31 and 32 and supports bell cranks 164 which are provided with a pair of narrow feeding rollers 165 engageable against the web 139a at a point adjacent the feeding roller 150. A rod 166 is adjustably connected with the free arms of the bell cranks 161 and 164. This is accomplished by threads 167 on the rod 166 engaged by nuts 168 abutting blocks 168a pivotally mounted on the bell cranks. A link 169 is pivotally connected with the rod 166 and is pivotally connected with one end of a lever 170 which is pivotally mounted intermediate of its ends by a pintle 171 mounted on the wall 31. The other end of the lever 170 pivotally connects with a lever 172 which is provided with a handle 173.

Another lever 174 is pivotally connected with the end of the lever 172 having the handle 173. This latter lever 174 is pivotally mounted by a pintle 175 upon the wall 31. With the parts as illustrated in Fig. 1 the front end of the lever 174, that is the end having the handle 173, is past the dead center of the pivot 175 and resting against a stop pin 174a. This locks the levers in the positions shown, and locks the cooperative feeding rollers 162 and 165 in operative positions under pressure against the feeding rollers 146 and 150. When desired the handle 173 may be moved upwards and held against a pivotally mounted catch 176 and this causes the lever 170 to pivot counter-clockwise about the pintle 171 so as to indirectly pivot the bell cranks 161 and 164 to disengage the cooperative feeding rollers 162 and 165 from the feeding rollers 146 and 150. The feeding roller 146 is driven by a gear transmission consisting of the gears 246a and 246b connected with the shaft of the adjacent counter pressure drum 35, (see Fig. 3). The feeding roller 150 is driven by a gear drive transmission consisting of gears 247a, 247b and 46 (see Fig. 2) connected with the shaft of the adjacent counter pressure drum 35.

The printing machine is provided with a heating unit for each printing unit 34. These heating units are substantially identical though they are of slightly different construction from each other. However, the heating units immediately past the first printing unit 34 with relation to the web supply roll 139 as shown in Fig. 1, and the third printing unit 34 are absolutely identical. Each of these heating units includes a pivotally mounted frame 178 which is pivotally supported by a pintle rod 179 upon brackets 180 mounted upon the side walls 31 and 32 of the frame 30, see particularly Fig. 3. These brackets 180 are also used to support the slides 40. Each bracket 180 has a top track portion 180a of U-shape in cross section (see Figs. 4 and 5) in which the slides 40 are mounted. The base portions of the casings 37 are also mounted in said track portions 180. Retaining strips 180b hold these parts on the track portions. Each bracket 180 has a slot 181 through which a pintle 182 passes. These pintles 182 are mounted upon the free ends of the arms 41. These pintles 182 are connected with the slides 40. An electric heater 183 is adjustably mounted upon the free end of the frame 178. This heater is provided with a trunnion 184 which is engaged by a clamp device 185 formed on the frame 178. The details of the electric heater 183 will not be given in this specification as it forms no part of the invention. However, the clamp device 185 makes it possible to place the heater 183 at a proper angle so as to be parallel with the adjacent section of the web 139a.

A radial arm 186 is fixedly mounted on the pintle rod 179 and pivotally connects with a link 187 which in turn is pivotally mounted upon the outer end of an arm 188 which is fixed on a pintle 189 mounted through one wall of the bracket 180. A handle 190 is mounted on the pintle 189. The link 187 is pivotally connected with the radial arm 188 by a pintle 191. This pintle 191 is slightly below dead center of the pintle 189. The arm 187 rests against a pin 192 mounted on the bracket 180. This pin prevents the arm 188 from moving any further counter-clockwise from its position as illustrated in Fig. 3. Thus the parts are locked in the position as here illustrated. However, the handle 190 may be further moved through a distance of substantially 180° so as indirectly to pivot the frame 178 counter-clockwise. This moves the heater 183 from its operating position and it is now inoperatively depending from the pintle rod 179.

The seconding printing unit is provided with a heating unit which includes a frame 195 pivotally mounted on a pintle rod 196. An electric heater 197 is supported on the frame 195. One side of the frame 195 is connected with a link 198 by a pintle 199. The other end of the link 198 is pivotally connected with a small arm 200 which is fixed upon a pintle rod 201 rotative through the side wall 31. The outer end of this pintle rod 201 is provided with a handle 202. A stop pin 203 is mounted on the wall 31 to limit clockwise turning of the small arm 200 past the dead center of the pintle rod 201. In this latter position of the parts the heater 197 will be parallel and immediately adjacent to the web 139a.

The last printing unit is provided with a heater which includes a pivotally mounted frame 205 which is pivotally supported by a pintle rod 206 on the frame 158. A handle 207 is connected with one end of the pintle rod 206 by which the heater 205 may be moved. A pin 208 is mounted on the handle 207 and is adapted to strike the end of the frame 158 when the heater 205 is in its operative position. As illustrated in Fig. 1 it is in its inoperative position and said pin 208 is now resting against a portion of the bracket 138. The handle 207 may be turned clockwise until the pin 208 engages the said frame 158 and then the heater 205 will be parallel and immediately adjacent a section of the web 139a at a point immediately to the rear of the roller 152.

The said rewind roll 139' is associated with a rewind drive. More specifically, the roll 139' is mounted on a roller 211 which is adjustably mounted on the shaft 212. This shaft has threaded portions 213 with right and left hand threads to facilitate positioning of the roller 211 in correct position. An adjustable collar 214 is mounted upon one section of the threads 213 and abuts one end of the roller 211. A hand wheel 215 is threadedly mounted on the other section of the threads 213 and abuts the other end of the roller 211. The shaft 212 is rotatively supported in bearings 216 and 217 mounted upon brackets 218. The shaft 212 is provided with a gear 219 which meshes with gear teeth 220 formed upon a clutch section 221 having an annular clutch lining member 221b. This clutch section 221 with the aid of ball bearings 221a is freely rotatively mounted upon a stationary stud shaft 222.

The stud shaft 222 is mounted on one of the brackets 218. A complementary clutch section 223 is also freely rotative on the stud shaft 222 with the aid of ball bearings 223a. This clutch section 223 is provided with a sprocket wheel 224. A thrust bearing 225 is mounted on the stud shaft 222 adjacent one side of the clutch section 221. A spring 226 is coaxially mounted on the stud shaft 222 and bears against the thrust bearing 225. A hand wheel 227 is threadedly mounted on the stud shaft 222 and controls the tension of the spring 226. The arrangement is such that the hand wheel 227 may be turned in one direction or the other to force the clutch section 221 at selected pressures against the clutch section 223. Thus the clutch may be adjusted to have a little slip, as desired.

The sprocket 224 is driven by a chain 230 engaging over a sprocket 231 on a rotative shaft 232 provided with a bevel gear 233 meshing with a bevel gear 234 on a rotative shaft 235 having a pulley 236, see Figs. 2 and 11. The shafts 232 and 235 are mounted on brackets 250 and 251 which are connected together and mounted on one of the brackets 218. An endless belt 237 engages over the pulley 236 and over a pulley 238 on the horizontal shaft 117.

An arrangement is provided for tensioning the belt 237. This tensioning means comprises an idler roller 239 rotative on a shaft 240. This shaft is adjustably supported in a bracket 241 mounted on the wall 32. Several adjustment screws 242 threadedly engage the bracket 241 and rotatively connect with bearings 244 which support the shaft 240 which pass through horizontal slots 245 formed in the bracket 241. The arrangement is such that the screws 242 may be screwed in or screwed out to move the roller 239 against the belt 237, and so properly tension the belt 237.

The operation of the device is as follows:
The electric motor 113 indirectly drives the vertical shafts 120 which indirectly drive the shafts 125 on which the counter pressure drums 35 are mounted. The gears 46 of each printing unit 34 drives the cylindrical forms 36 and the furnishing rollers 38. The web 139 is moved through the printing machine by the action of the transmission gears 247a and 247b which drive the feeding rollers 150. The web 139a is assisted in its motion by the driven feeding roller 146 which is worked by the gears 246a and 246b, the latter being mounted on one of the driven shafts 125.

The hand wheel 52 may be turned through a limited distance as controlled by the projection 53 (see Fig. 7) working between the pin 54 and the pawl 55. This operation moves the chain 43 which simultaneously turns the gears 42 and indirectly moves the arms 41 to move the casings 37 so that the cylindrical forms 36 are moved out of contact from the web 139a which engages against the counter pressure drums 35. However, the motion of the arms 41 is limited so as to maintain engagement of the gears 45 and 46.

If desired these gears may be moved out of mesh, simultaneously, by lifting the pawl 55 and further turning the hand wheel 52. Or, these gears 45 and 46 of any particular printing unit 34 may be disconnected individually by the operation of their associated handle 59. The cooperative feeding rollers 165 and 162 which act against the feeding rollers 150 and 146, respectively, may be simultaneously moved out of operative positions and replaced, by the operation of the handle 173.

The various heating units, which may be identified by noting their frames 178, 195 and 205, may be individually moved into and out of operating positions to assist in drying the inks which are printed on the moving web 139a.

During the operation of the printing machine the web 139a is being collected on the rewind roll 139' which is arranged on a driven rewind drum 211. This drum is driven by a new device which includes a control, operable by the handle 227 which may be turned to control the operation of the clutch sections 221 and 223.

It is believed that a more detailed understanding of the operation of the machine is clear from the preceding specification of its construction.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. In a continuous web printing machine having a counter pressure drum mounted on a frame of said machine and cooperative with a cylindrical form which is mounted on a casing, brackets mounted on said casing, means for adjusting said brackets on said casing, a furnishing roller mounted on said brackets and having a shaft, means for driving said shaft, a worm on said shaft, a cooperative worm meshing with said worm and mounted on said bracket, a link eccentrically mounted on said cooperative worm, an ink pan for said furnishing roller, means for releasably supporting said ink pan, means for oscillating said ink pan controlled by the movement of said link, and a doctor blade mounted on said ink pan for said furnishing roller.

2. In a continuous web printing machine having a counter pressure drum mounted on a frame of said machine and cooperative with a cylindrical form which is mounted on a casing, brackets mounted on said casing, means for adjusting said brackets on said casing, a furnishing roller mounted on said brackets and having a shaft, means for driving said shaft, a worm on said shaft, a cooperative worm meshing with said worm and mounted on said bracket, a link eccentrically mounted on said cooperative worm, an ink pan for said furnishing roller, means for releasably supporting said ink pan, means for oscillating said ink pan controlled by the movement of said link, and a doctor blade mounted on said ink pan for said furnishing roller, said means for releasably supporting said ink pan comprises bars attached to the ink pan and engaging above pivotally mounted flap members, and latches for holding said flap members in supporting positions.

3. In a continuous web printing machine having a counter pressure drum mounted on a frame of said machine and cooperative with a cylindrical form which is mounted on a casing, brackets mounted on said casing, means for adjusting said brackets on said casing, a furnishing roller mounted on said brackets and having a shaft, means for driving said shaft, a worm on said shaft, a cooperative worm meshing with said worm and mounted on said bracket, a link eccentrically mounted on said cooperative worm, an ink pan for said furnishing roller, means for releasably supporting said ink pan, means for oscillating said ink pan controlled by the movement of said link, and a doctor blade mounted on said ink pan for said furnishing roller, said means for releasably supporting said ink pan comprises bars attached to the ink pan and engaging above pivotally mounted flap members, and latches for holding said flap members in supporting positions, said means for oscillating said ink pan comprises a pivotally mounted arm having a stud engaging one of said bars, and said link being connected with said arm for oscillating the arm.

4. In a continuous web printing machine having a counter pressure drum mounted on a frame of said machine and cooperative with a cylindrical form which is mounted on a casing, brackets mounted on said casing, means for adjusting said brackets on said casing, a furnishing roller mounted on said brackets and having a shaft, means for driving said shaft, a worm on said shaft, a cooperative worm meshing with said worm and mounted on said bracket, a link eccentrically mounted on said cooperative worm, an ink pan for said furnishing roller, means for releasably supporting said ink pan, means for oscillating said ink pan controlled by the movement of said link, a doctor blade mounted on said ink pan for said furnishing roller, and means for supporting and adjusting the pressure of said doctor blade against said furnishing roller.

5. In a continuous web printing machine having a counter pressure drum mounted on a frame of said machine and cooperative with a cylindrical form which is mounted on a casing, brackets mounted on said casing, means for adjusting said brackets on said casing, a furnishing roller mounted on said brackets and having a shaft, means for driving said shaft, a worm on said shaft, a cooperative worm meshing with said worm and mounted on said bracket, a link eccentrically mounted on said cooperative worm, an ink pan for said furnishing roller, means for releasably supporting said ink pan, means for oscillating said ink pan controlled by the movement of said link, a doctor blade mounted on said ink pan for said furnishing roller, and means for supporting and adjusting the pressure of said doctor blade against said furnishing roller, comprising blocks having slots engaged in from the bottom sides and engaged on the sides of said ink pan with the sides of the ink pan engaging into said slots, said doctor blade being mounted upon the inner portions of said blocks, means on the outer sides of said ink pan for pivotally supporting said blocks, and means for holding said blocks in various pivoted positions.

6. In a continuous web printing machine having a counter pressure drum mounted on a frame of said machine and cooperative with a cylindrical form which is mounted on a casing, brackets mounted on said casing, means for adjusting said brackets on said casing, a furnishing roller mounted on said brackets and having a shaft, means for driving said shaft, a worm on said shaft, a cooperative worm meshing with said worm and mounted on said bracket, a link eccentrically mounted on said cooperative worm, an ink pan for said furnishing roller, means for releasably supporting said ink pan, means for oscillating said ink pan controlled by the movement of said link, a doctor blade mounted on said ink pan for said furnishing roller, and means for supporting and adjusting the pressure of said doctor blade against said furnishing roller, comprising blocks having slots engaged in from the bottom sides and engaged on the sides of said ink pan with the sides of the ink pan engaging into said slots, said doctor blade being mounted upon the inner portions of said blocks, means on the outer sides of said ink pan for pivotally supporting said blocks, and means for holding said blocks in various pivoted positions comprising bushings rotatively supported on said ink pan, and rods pivotally connected with said blocks and threadedly connected with said bushings.

7. In a continuous web printing machine having a counter pressure drum mounted on a frame of said machine and cooperative with a cylindrical form which is mounted on a casing, brackets mounted on said casing, means for adjusting said brackets on said casing, a furnishing roller mounted on said brackets and having a shaft, means for driving said shaft, a worm on said shaft, a cooperative worm meshing with said worm and mounted on said bracket, a link eccentrically mounted on said cooperative worm, an ink pan for said furnishing roller, means for releasably supporting said ink pan, means for oscillating said ink pan controlled by the movement of said link, a doctor blade mounted on said ink pan for said furnishing roller, and means for supporting and adjusting the pressure of said doctor blade against said furnishing roller, comprising blocks having slots engaged in from the bottom sides and engaged on the sides of said ink pan with the sides of the ink pan engaging into said slots, said doctor blade being mounted upon the inner portions of said blocks, means on the outer sides of said ink pan for pivotally supporting said blocks comprising pins projecting from said blocks and turnably supported on said ink pan, and means for holding said blocks in various pivoted positions.

8. In a continuous web printing machine having a counter pressure drum mounted on a frame of said machine and cooperative with a cylindrical form which is mounted on a casing, brackets mounted on said casing, means for adjusting said brackets on said casing, a furnishing roller mounted on said brackets and having a shaft, a cooperative worm meshing with said worm and mounted on said bracket, a link eccentrically mounted on said cooperative worm, an ink pan for said furnishing roller, means for releasably supporting said ink pan, means for oscillating said ink pan controlled by the movement of said link, a doctor blade mounted on said ink pan for said furnishing roller, and means for supporting and adjusting the pressure of said doctor blade against said furnishing roller, comprising blocks having slots engaged in from the bottom sides and engaged on the sides of said ink pan with the sides of the ink pan engaging into said slots, said doctor blade being mounted upon the inner portions of said blocks, means on the outer sides of said ink pan for pivotally supporting said blocks, comprising auxiliary blocks on said ink pan and having slots extended inwards from their top faces, pins projecting from said blocks and turnably engaging in said slots of said auxiliary blocks, and latches mounted on said auxiliary blocks and removably extending across said slots of said auxiliary blocks, and means for holding said blocks in various pivoted positions.

9. In a continuous web printing machine having a counter pressure drum mounted on a frame of said machine and cooperative with a cylindrical form which is mounted on a casing, brackets mounted on said casing, means for adjusting said brackets on said casing, a furnishing roller mounted on said brackets and having a shaft, means for driving said shaft, a worm on said shaft, a cooperative worm meshing with said worm and mounted on said bracket, a link eccentrically mounted on said cooperative worm, an ink pan for said furnishing roller, means for releasibly supporting said ink pan, means for oscillating said ink pan controlled by the movement of said link, and a doctor blade mounted on said ink pan for said furnishing roller, and means for releasably supporting said ink pan comprising bars attached to the ink pan and engaging above pivotally mounted flap members, and latches for holding said flap members in supporting positions, said latches being pivotally mounted and having shoulders engaging beneath said flap members, and springs urging said latches in their operative positions.

EUGENE H. KLINGELFUSS.